(12) United States Patent
Dorn et al.

(10) Patent No.: US 10,351,045 B2
(45) Date of Patent: Jul. 16, 2019

(54) LIGHT SOURCE SUPPORT WITH A REFERENCING ELEMENT EXTENDING ALONG TWO AXES

(71) Applicant: VALEO VISION, Bobigny (FR)

(72) Inventors: David Dorn, Bobigny (FR); Christophe Cherreau, Bobigny (FR); Pierre Renaud, Bobigny (FR); Silas Bakary-Gando, Bobigny (FR); Laurent Garrouste, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/717,485

(22) Filed: Sep. 27, 2017

(65) Prior Publication Data
US 2018/0086249 A1 Mar. 29, 2018

(30) Foreign Application Priority Data
Sep. 27, 2016 (FR) ..................................... 16 59135

(51) Int. Cl.
| | | |
|---|---|---|
| *B60Q 1/00* | (2006.01) | |
| *F21V 19/00* | (2006.01) | |
| *F21V 21/14* | (2006.01) | |
| *F21S 41/19* | (2018.01) | |
| *F21S 41/39* | (2018.01) | |

(Continued)

(52) U.S. Cl.
CPC .......... *B60Q 1/0035* (2013.01); *F21S 41/148* (2018.01); *F21S 41/19* (2018.01); *F21S 41/192* (2018.01); *F21S 41/336* (2018.01); *F21S 41/39* (2018.01); *F21S 43/14* (2018.01); *F21S 43/19* (2018.01); *F21S 43/37* (2018.01); *F21V 19/003* (2013.01); *F21V 21/14* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 5,730,522 | A | * | 3/1998 | Wyke ...................... F21V 19/00 248/200 |
| 6,079,852 | A | * | 6/2000 | Kamaya ............... B60Q 1/0483 362/287 |

(Continued)

FOREIGN PATENT DOCUMENTS

| | | |
|---|---|---|
| DE | 10 2015 103 649 A1 | 9/2016 |
| EP | 2 508 795 A2 | 10/2012 |

(Continued)

OTHER PUBLICATIONS

French Preliminary Search Report dated Jun. 28, 2017 in French Application 16 59135, filed on Sep. 27, 2016.

*Primary Examiner* — Christle I Marshall
(74) *Attorney, Agent, or Firm* — Oblon, McClelland, Maier & Neustadt, L.L.P.

(57) ABSTRACT

The present invention relates to a support for a light source of a lighting device of a motor vehicle, including a zone for positioning the light source, referencing elements with respect to three given mutually transverse axes, one of the referencing elements, termed a referencing element with two portions, a first portion extending along or parallel to a first axis of the three given axes, and a second portion extending transversely relative to this first given axis.

20 Claims, 3 Drawing Sheets

(51) Int. Cl.
*F21S 43/19* (2018.01)
*F21S 43/14* (2018.01)
*F21S 43/37* (2018.01)
*F21S 41/33* (2018.01)
*F21S 41/148* (2018.01)
*F21Y 115/10* (2016.01)

(56) References Cited

U.S. PATENT DOCUMENTS

| | | | |
|---|---|---|---|
| 9,803,838 B1* | 10/2017 | Wronski | F21S 8/02 |
| 10,052,997 B2* | 8/2018 | Shibata | B60Q 1/076 |
| 2012/0257400 A1 | 10/2012 | Shibata | |
| 2013/0334392 A1* | 12/2013 | Hill | F16M 13/00 |
| | | | 248/500 |
| 2015/0377440 A1 | 12/2015 | Reitegger et al. | |
| 2017/0030544 A1* | 2/2017 | Tsuda | G02B 26/10 |
| 2017/0299143 A1* | 10/2017 | Mornet | F21V 23/06 |

FOREIGN PATENT DOCUMENTS

| | | |
|---|---|---|
| EP | 2 956 335 | 12/2015 |
| FR | 3 026 360 | 4/2016 |
| FR | 3 026 467 | 4/2016 |

\* cited by examiner

LIGHT SOURCE SUPPORT WITH A REFERENCING ELEMENT EXTENDING ALONG TWO AXES

The present invention relates to the field of light source supports that are intended to be mounted in vehicle light-emitting devices, in particular to cooperate with a shaping optic receiving the light rays from the light sources that they are intended to support.

There are known vehicle light-emitting devices comprising a shaping optic adapted to deflect the light rays coming from a particular zone in the light-emitting device so as to confer on the light beam given photometrics, notably statutory photometrics.

Also, when mounting the light source in the light-emitting device, it is important that this light source be mounted accurately in the particular zone and in accordance with a precise orientation in the three dimensions of space.

To this end, the light source supports comprise referencing elements with respect to three given axes transverse to one another, notably three axes orthogonal to one another. These referencing elements are adapted to come into contact with other referencing elements disposed in the light-emitting device. The referencing elements with respect to one of the three given axes of the light-emitting device are adapted, when they are in contact with the corresponding referencing elements of the support, to immobilize the support with respect to that given axis and to leave the support free to move with respect to the other two axes, thus enabling adjustment on the other two given axes. These various referencing elements of the support and the lighting device are adapted so that, when they are all in contact, the light source is in the given zone.

For this to work, the light source must also be correctly positioned on the support relative to these referencing elements of the support.

The mounting of the light source on a light-emitting support can be automated, in particular in the case of light-emitting diodes (LED). To this end, a robot can be associated with an image capture device coupled to image processing means. The latter means are coupled to control means of the robot. The vision system can comprise a single video camera capturing images in two dimensions.

The optical axis of the objective of the video camera can be aligned with respect to a first given axis. In the case of an LED placed on a plane surface of the support of that LED, this first given axis is preferably an axis perpendicular to this plane surface, for example a vertical axis. Because of this, the captured images will enable precise detection of the positioning of the zone where the LED is to be placed with respect to the other two axes and therefore relative to the referencing elements visible in the plane including the plane surface.

However, the support can have a shape such that with an automation system of this kind certain referencing elements will not be visible because they are aligned with a portion of the support in a direction parallel to the optical axis of the video camera. This is for example the case when a referencing element extending in a wall of the support parallel to the first given axis, for example an axis perpendicular to the surface on which the LED is placed.

Because of this, the positioning of the LED on its support will be inaccurate. Subsequently, even if the mounting of the support in the light-emitting device is accurate, the positioning of the LED relative to the shaping optic will be inaccurate.

The technical problem addressed by the invention is therefore to find a more accurate method of mounting a support for light sources in a lighting device.

To this end, a first object of the invention is a support for a light source of a lighting device of a motor vehicle, comprising:
 a zone for positioning the light source,
 referencing elements with respect to three given mutually transverse axes, one of the referencing elements, termed a referencing element with two portions, comprising:
  a first portion extending along or parallel to a first of the three given axes, and
  a second portion extending transversely relative to this first given axis.

Accordingly, by aligning a video camera capturing images in two dimensions with the first portion, or aligning it with respect to an axis parallel to the first given axis, the second portion will be visible to this video camera, and accurately so relative to the referencing means.

Moreover even in the case of alignment of this referencing element with two portions with a portion of the support in a direction parallel to this first given axis, the referencing element with two portions will remain visible to the video camera. This will therefore enable use of a video camera for the accurate fixing of the LED even with supports having this kind of alignment, for example a support with a wall perpendicular to a positioning surface of the LED, the first portion of this referencing element with two portions being arranged in this wall.

The light-emitting module according to the invention can optionally comprise one or more of the following features:
 the support comprises:
  a first surface extending transversely relative to the first given axis and comprising said second portion and said positioning zone, and
  a second surface that is oriented on the side of the first surface, is transverse to the first surface, extends along or parallel to the first given axis and comprises said first portion;
 by transverse faces is meant faces contained in intersecting transverse planes, these faces not necessarily intersecting; this support enables more accurate positioning in a light-emitting device by positioning each of the surfaces relative to the shaping optic, for example on a support plate for this shaping optic or directly on the latter;
 the support comprises a wall comprising the second surface, the first portion being a recess formed in the wall and opening onto the second surface; just as the first portion is not visible to a video camera with its objective aligned with the second surface, the second portion will be visible and on positioning the light source relative to this second portion, this second portion will also be positioned relative to the first portion and therefore relative to the referencing element with two portions;
 the first surface comprises the other referencing elements; thus it is easier to position the light source relative to all of the referencing elements;
 the first surface is plane and lies in a first plane and the second surface is plane and lies in a second plane, the first plane and the second plane being transverse to each other, notably substantially perpendicular to each other; this facilitates the positioning of the support in the light-emitting device;
 the first surface and the second surface join via a bend or a curved portion, said referencing element in two portions being a hole straddling the first and second surfaces, the part of the hole on the first surface forming said second portion of said referencing element with two portions and the part of the hole on the second surface forming said first portion of said referencing element with two portions; the hole is therefore continuous from the first surface to the second surface; this simplifies the production of the referencing element with two portions in the support, retaining good accuracy for the positioning of the second portion;

the first portion and/or said second portion of said referencing element with two portions is oblong; this type of hole is simple and accurate to produce;

the support comprises:
  a first part in the form of a plate and comprising the first surface, and
  a second part in the form of a plate comprising the second surface, the two plates being transverse to each other;

this is a simple embodiment of a support;

the first part comprises at least one tongue comprising an edge lying in a plane substantially perpendicular to a second of the three given axes; the edge thus forms said second referencing element; this is a simple embodiment of referencing means with respect to the second given axis also visible to a video camera the objective of which is oriented along the first given axis; moreover, the tongues can serve for mounting by sliding in slideways ending at an abutment extending in a plane substantially perpendicular to the second given axis so that at the end of sliding the referencing with respect to the second given axis is effected by abutment of the edges against the abutments of the slideways;

the first part comprises at least three bosses forming projections on the first surface, the summits of the bosses being coplanar in a plane substantially perpendicular to said first given axis; the edge therefore forms said third referencing elements; this is a simple embodiment of referencing means with respect to the first given axis also visible to a video camera the objective of which is oriented along the first given axis; these summits once in contact with coplanar surfaces orthogonal to the first given axis will enable referencing of the first surface with respect to the first given axis;

the first plate comprises at least two tongues arranged on either side of said positioning zone, each tongue comprising an edge lying in a plane perpendicular to a second of the three given axes, the bosses being formed on the tongues; thus the referencing with respect to the first given axis can be effected by simply sliding the tongues in slideways of the light-emitting device, each slideway comprising a groove the sliding walls of which, against which the tongues and the bosses will slide, are arranged in a plane substantially perpendicular to the first given axis;

the support is a plate, for example with two parts in the form of plates as referred to above;

the support is a metal, notably aluminum or aluminum alloy, plate; this also enables implementation of the function of cooling the light source and also facilitates production of the support;

the support is produced by deforming, notably by bending, curving or pressing, a metal plate comprising a rectilinear oblong hole extending along its length, the deformation being affected about a given direction perpendicular to this length of said oblong hole; thus the support is easier to produce in two parts, with the referencing element with two portions divided across these two parts;

the second surface is substantially perpendicular to a second of the three given axes, termed the second given axis; it thus becomes easier to position the second surface and therefore the first surface relative to the first given axis when mounting the support in a light-emitting device;

the three given axes are orthogonal to one another; this enables easier identification of the positioning zone and also easier referencing of the support in the light-emitting device;

the support comprises the light source fixed to the positioning zone; the support is therefore ready to be mounted in a light-emitting device according to the invention;

the light source is an electroluminescent light source, notably an LED; the invention is particularly adapted to this situation, in which the positioning of the light source is even more important;

the support is a heatsink; this simplifies the design of the support with its light source in a light-emitting module intended to be mounted relative to a shaping optic;

the light source is fixed in thermal contact with the support; this enables easy cooling of the light source, in particular in the case of an electroluminescent light source.

The invention also consists in a vehicle light-emitting device comprising at least one support according to the invention.

This vehicle light-emitting device can be:
  a device for lighting the road, notably a headlight or a fog light;
  a signaling light, notably a stop light, a daytime running light, a night-time running light, a turn indicator;
  an interior lighting device, namely a device for lighting the interior of the passenger compartment of a vehicle, notably an overhead light or a wall light.

The light-emitting device according to the invention can optionally comprise one or more of the following features:
  the light-emitting device comprises at least one shaping optic and complementary referencing elements adapted to be in contact with the referencing elements of the support, so that the shaping optic receives most of the light rays emitted by the light source and diverts them to form a given photometric beam; mounting the support in the light-emitting device is simple, because it suffices to bring the referencing elements into contact so that the support according to the invention, and therefore the light source, is correctly positioned relative to the shaping optic;
  said complementary referencing elements comprise a projection extending lengthwise along or parallel to a second of the three given axes, termed the second given axis, the referencing element with two portions of the support being a hole in the support, the projection extending into this hole and having zones of contact with the edges of the hole, these contact zones being on either side of the projection and aligned in a direction parallel to a third of the three given axis, termed the third given axis; thus the edges of the hole form the first referencing means, enabling referencing with respect to the third given axis;
  the complementary referencing elements comprise aligned slideways along or parallel to said second given axis, and the support comprises tongues accommodated in these slideways and adapted to slide in these slideways; mounting is simple; moreover, in combination with the preceding paragraph, the hole makes it possible to allow the degree of freedom of movement along said second given axis, facilitating assembly;

the slideways comprise an end lying in a plane substantially perpendicular to said second given axis, the support including tongues each having an edge extending substantially perpendicularly to said second given axis and in contact with one of the ends; thus the referencing with respect to said second given axis is achieved by simple sliding into abutment;

the support comprises at least three bosses distributed over the tongues and the slideways comprise sliding walls extending between the entry of the slideways and their end, these sliding walls being substantially perpendicular to said first given axis and oriented toward the interior of the slideway, each boss having a summit, these summits being coplanar in a plane substantially perpendicular to said first given axis, the summits of the bosses being in contact with the sliding walls; thus engaging the tongues and the bosses in the slideways enables referencing of the positioning zone along the first given axis;

said first given axis is the vertical axis, said second given axis is the longitudinal axis, said third given axis is the transverse axis; the support is thus positioned in the three directions of space.

The invention also consists in a method of manufacturing a light source support, said method comprising:
a step of positioning a support comprising:
zone for positioning the light source,
referencing elements with respect to three given mutually transverse axes, one of the referencing elements, termed a referencing element with two portions, comprising:
a first portion extending along or parallel to a first of the three given axes, and
a second portion extending transversely relative to this first given axis, then
a step of placing a video camera facing said positioning zone so that the optical axis of the objective of the video camera is parallel to or aligned with said first given axis,
a step of capturing at least one image of the support,
a step of identification in the image of said second portion of the referencing element with two portions and the other referencing elements,
a step of determination of the location of the positioning zone relative to the positions of said second portion of the referencing element with two portions and to the positions of the other referencing elements,
a step of placing the light source on said positioning zone.

This therefore enables accurate mounting of a light source on a support according to the invention.

The method according to the invention can optionally comprise one or more of the following features:
the support is a support according to the invention;
the placement step comprises:
a substep of positioning a holding member holding the light source between the video camera and the support,
a substep of aligning the light source with the positioning zone in a direction parallel to or aligned with said first given axis,
a substep of moving the light source in translation toward the positioning zone until the light source comes into contact with the positioning zone;
this enables simple and accurately guided mounting of the light source on the support;
the light source is an LED having a light-emitting surface and a contact surface opposite its emitting surface; moreover, during the substep of aligning the LED, the LED is also oriented so that its contact surface is positioned facing the positioning zone, notably perpendicularly to the first given axis; for example an adhesive or a glue can be applied to the LED and/or the positioning zone;
the step of positioning the support is preceded by a step of shaping the support, this step comprising:
a substep of producing on and/or in a metal sheet a rectilinear element elongate in a given direction, termed the principal direction,
a substep of producing second and third referencing elements,
a step of deforming the metal sheet in a given direction, termed the deformation direction, to form a deformation zone extending in the deformation direction and on the one hand dividing the plate into a first part and a second part and on the other hand dividing the rectilinear element into a first portion and a second portion, the first part comprising the positioning zone and this second portion and the second part, which is transverse to the first part, comprising this first portion, this first portion and this second portion forming said referencing element with two portions;
the rectilinear element is produced by drilling, machining and/or cutting an oblong hole through the plate, the hole forming after the deformation step the referencing element with two portions.

According to the application, a shaping optic deviates the light rays emitted by the corresponding light source of the device so as to confer on the beam from the light-emitting device given photometric characteristics, notably those of a beam for lighting the road. The shaping optic can comprise a reflector, a combination of lenses, a combination of reflectors or a combination of lenses and reflectors.

In the present application, a light-emitting light source is a light source employing electroluminescence. Electroluminescence is an optical and electrical phenomenon in which a material emits light in response to an electrical current flowing through it or a strong electric field. This is to be distinguished from the emission of light because of temperature (incandescence) or the action of chemical products (chemiluminescence). In the lighting field a light source of this kind is also termed a "solid state light source".

The invention also consists in a vehicle comprising a light-emitting device according to the invention and notably connected to the electrical power supply of the vehicle.

Unless otherwise indicated, the terms "front", "rear", "lower", "upper", "side", "transverse" refer to the direction of emission of light from the corresponding light-emitting device.

Other features and advantages of the invention will become apparent on reading the following detailed description of examples, for an explanation of which see the appended drawings, in which.

Figure 1:
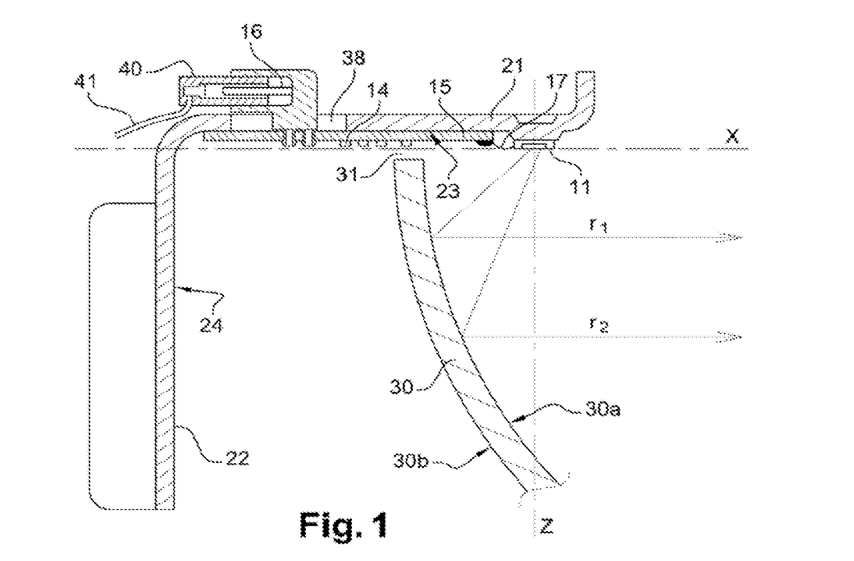
FIG. 1 is a sectional view of a light source support according to the invention positioned relative to a shaping optic.

FIG. 1 shows a support 20 in accordance with the invention for a light source 11, in position in a light-emitting device according to the invention. Only the shaping optic 30 of this light-emitting device is shown.

In this example, this shaping optic is a reflector 30 having a reflecting surface 30a facing toward the front and an inactive surface 30b facing toward the rear.

As can be seen, the support 20 is arranged relative to this reflector 30 so that the light source, here an LED 11, directs rays r1, r2 toward the reflecting surface 30a. The reflecting surface 30a is adapted to direct these rays r1, r2 in particular directions so as to form a light beam with given photometrics, in this example a lighting beam.

In this example, the support 20 is formed by a plate comprising a first part 21 and a second part 22. The first part 21 and the second part 22 therefore each take the form of a plate.

In this example, the first part 21 is arranged horizontally when the support 20 and the light-emitting device 1 are in position in the vehicle.

The first part 21 comprises a first surface of the support, termed the lower surface 23. This lower surface 23 is plane and oriented on the side of the second part 22.

In this example, the LED 11 is arranged on this lower surface 23 and above the reflecting surface 30.

The second part 22 also takes the form of a plane plate, is substantially vertical and extends transversely.

The second part 22 comprises a second surface of the support, termed the front surface 24. This front surface 24 is plane and oriented transversely and vertically facing the inactive surface 30b. It is therefore orthogonal to the first surface 23.

Figure 2:
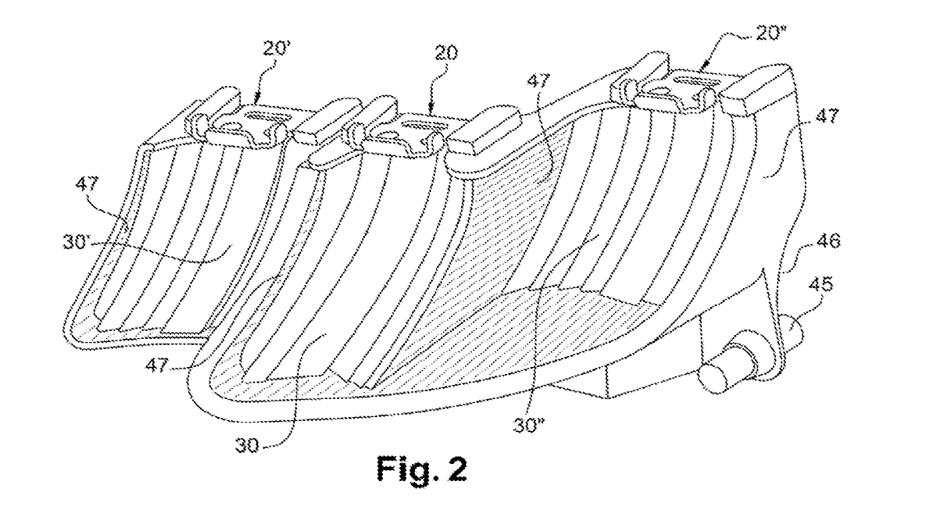
FIG. 2 is a perspective view from the front of a part of a light-emitting device according to the invention comprising the support from FIG. 1.

As can be seen in FIG. 2, the light-emitting device 1 according to the invention comprises a housing closed by an outer lens, this housing and this outer lens not being shown in FIG. 2. Inside this housing, the light-emitting device 1 also comprises a plate 46 supporting three reflectors 30, 30', 30", namely a central reflector 30, a left-hand reflector 30" and a right-hand reflector 30'.

In this example, the plate 46 is formed in one piece with these reflectors 30, 30', 30". In particular the plate 46 can be made in one piece with and of the same material as these reflectors 30, 30', 30".

Here, the plate 46 comprises separator walls 47 separating the reflectors 30, 30', 30" from one another. These separator walls 47 can be masks, as shown here.

A first support 20, a second support 20' and a third support 20" are arranged at the level of the central reflector 30, the right-hand reflector 30' and the left-hand reflector 30", respectively. Each of these supports 20, 20', 20" is equipped with an LED 11.

In this example, the first and third supports 20, 20" and their LED are identical. Therefore, they carry the same references in the subsequent figures. On the other hand, the second support 20' and its LED are different. However this example is without limitation, and for example each support could carry a different LED.

Figure 3:
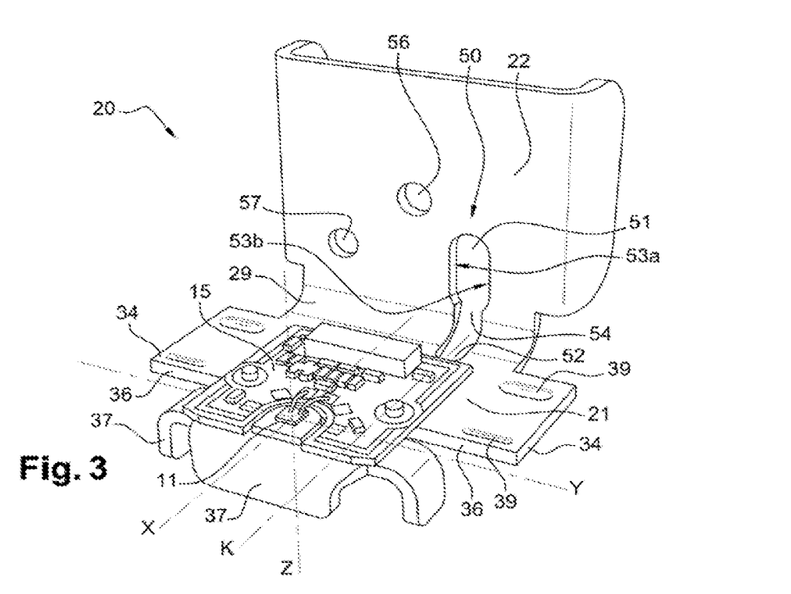
FIG. 3 is a perspective view from below of a light source support according to the invention.
Figure 4:
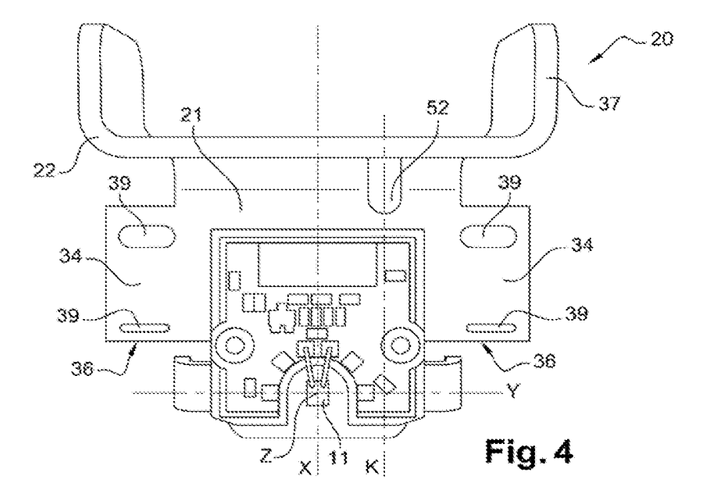
FIG. 4 is a view from below of FIG. 3.

As shown in FIGS. 3 and 4, at the level of each support 20, 20', 20" are chosen three given axes X, Y, Z along which are arranged referencing elements adapted to reference the positioning of the support 20, 20', 20" relative to the corresponding reflector 30, 30', 30" and along these three given axes X, Y, Z. In this example these given axes are chosen to be perpendicular to one another and cross at the level of the positioning zone of the LED 11. They therefore form an orthonomic system of axes at the level of this positioning zone and at the level of the LED 11 when it is placed thereon.

In FIGS. 3 and 4 the support 20 is upside-down relative to the vertical axis Z compared to its orientation in which it is intended to be used in the light-emitting device shown in FIG. 2. In fact, the orientation in FIGS. 3 and 4 corresponds in this example to the orientation conferred on the support 20 on a production line, before mounting the LED 11.

Therefore, the upper face of the support 20 is not visible in FIGS. 3 and 4.

In this example, the support 20 takes the form of a pressed metal plate. The latter is initially plane and the various holes that can be seen in it can be drilled or machined before this plate is shaped to form the support 20 shown.

Here, the plate has been deformed, for example pressed or bent, so as to form two transverse parts, namely the first part 21 and the second part 22. As can be seen in these FIGS. 3 and 4, the two parts 21 and 22 are not entirely adjacent but are joined together by a curved part 29, which is the part that has undergone the deformation.

In this example this deformation is in a direction parallel to the transverse axis Y, with the result that this curved part 29 has a cylindrical shape the generatrices of which are parallel to that direction.

According to one embodiment of the invention and as here, there is initially formed in the plate intended to form the support 20 an oblong through-hole 50 extending in a principal direction K. After deformation, this oblong hole 50 forms a referencing element with two portions having a first portion 51 arranged in the wall formed by the second part 22 and a second portion 52 arranged in the first part 21, here in the wall formed by the first part 21. Because of this, each of the portions 51, 52 forms a hole passing through each of these parts. This oblong hole is therefore continuous and extends from the first part 22 to the second part 21 via the curved part 29.

Because of this, the second part 22 comprises a referencing element hereinafter termed the referencing element 50 with two portions.

According to this example, the first portion 51 therefore extends lengthwise along a first of the three given axes, namely in this example the vertical axis Z.

According to the invention, as in this example, the principal direction K is oriented along an axis parallel to a second of the three given axes, namely in this example the longitudinal axis X.

According to the invention, the edges 53a and 53b of this first portion 51 of this oblong hole 50 can form transverse abutments, enabling referencing with respect to a third of the three given axes. This is therefore the case in this example, where this third given axis is the transverse axis Y. The oblong hole 50 therefore forms a referencing element with respect to the third given axis, here the transverse axis Y.

According to the invention, as in the example shown, the first surface 23 can also comprise a printed circuit 15 to which the LED 11 is connected, for example, as here, by soldered leads 17.

In this example, the LED 11 is mounted directly on a portion of the support 20 at a distance from the printed circuit 15. This is without limitation however. In effect, the LED can alternatively be positioned directly on the printed circuit.

This first part 21 also comprises lateral tongues 34 arranged on either side of the longitudinal axis X. Each of these tongues 34 is coplanar with the part of the first surface 23 supporting the printed circuit 15.

These tongues 34 comprise front edges 36 in the same plane perpendicular to the longitudinal axis X. Because of this, these front edges 36 form referencing means with respect to the longitudinal axis X, allowing degrees of freedom along the transverse axis Y and the vertical axis Z.

Moreover, the surface of these tongues oriented on the side of the second part 22, which is part of the first surface 23, comprise bosses 39. These bosses 39 can be produced by pressing, for example. In this example, these bosses 39 project from the first surface 23.

These bosses 39 each have a summit. All of these summits are arranged in the same plane. That plane is perpendicular to the vertical axis Z. Because of this, these summits form referencing elements with respect to the vertical axis Z, allowing degrees of freedom in movement along the longitudinal axis X and the transverse axis Y.

These bosses 39 can, as in this example, be distributed in the following manner: a front boss on each of the two lateral tongues and a rear boss on each of the two lateral tongues. This therefore improves stability in vertical referencing.

According to the invention, and as in this example, these bosses 39 can be elongate in a direction parallel to the second given axis, here the transverse axis Y. Each summit forming a line parallel to the second given axis Y. This further improves vertical referencing.

The second part 22 also comprises first and second fixing holes 56 and 57. The second part 22 and the part 21 are also shaped to include fins 37 encouraging heat dissipation and therefore cooling of the LED 11 and the electronic components 14 on the printed circuit 15.

When the support is on the production line, the image captured by a video camera with the optical axis of the objective arranged along the vertical axis Z is as shown in FIG. 4.

As can be seen in this FIG. 4, the first portion 51 of the oblong hole 50 is not visible. In effect it is aligned with the vertical axis Z and in particular aligned with the wall formed by the second part 22.

However, the second portion 52 is visible. What is more, it can be seen that it extends in the direction K parallel to the longitudinal axis X. Therefore, in the image captured by the video camera, image processing means can easily identify the referencing elements with respect to the longitudinal axis X, namely here the front edges 36, the referencing elements with respect to the vertical axis Z, namely here the bosses 39, but also the referencing element with respect to the transverse axis Y, namely the oblong hole 50, thanks to its second portion 52.

It follows that means for processing these images will easily identify the positioning zone for the LED 11 relative to the three given axes X, Y, Z.

Because of this it will be easy to control accurately a robot positioning this LED 11.

This is particularly suitable for the situation where the LED 11 is mounted by a pick and place process. This pick and place process comprises the action of placing the LED 11 by a movement in translation toward the positioning zone, here a movement in translation along the vertical axis Z. It follows that with a video camera and control means it is possible to mount the LED by simply picking and placing it accurately relative to the various referencing elements 50, 39, 36 of the support.

These referencing elements 50, 39, 36 enable referencing of the support 20 relative to complementary referencing elements 61, 64, 35 included in the light-emitting device 1. Accordingly, the supports 20, 20', 20" of the light source 11 will be positioned accurately relative to the shaping optics 30, 30', 30" of the light-emitting device 1. Consequently, the light source 11 will be positioned accurately relative to the shaping optics 30, 30', 30".

Figure 5:
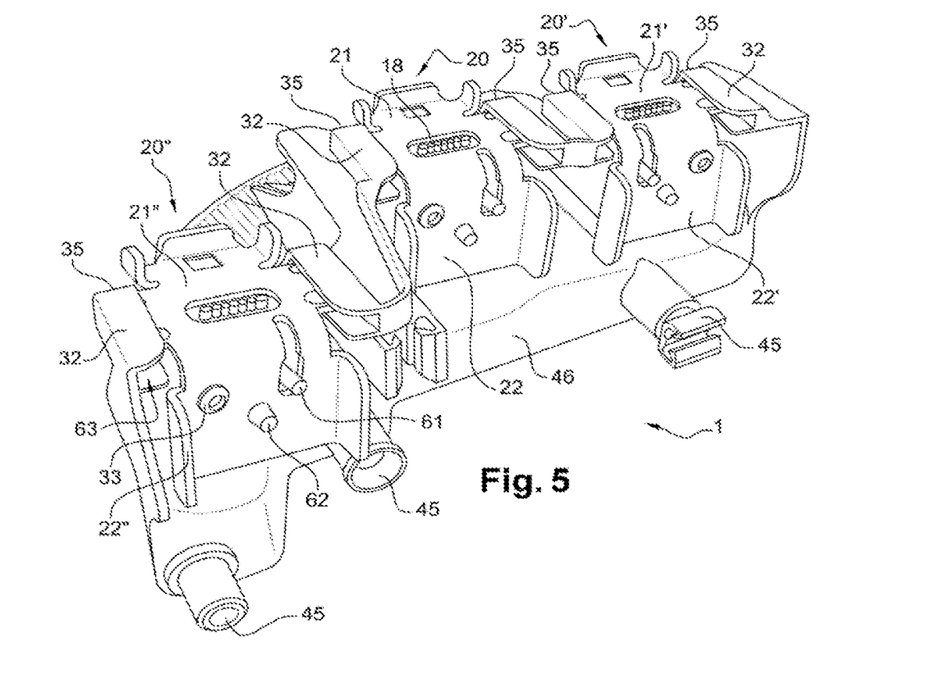
FIG. 5 is a rear view of FIG. 2.
Figure 6:
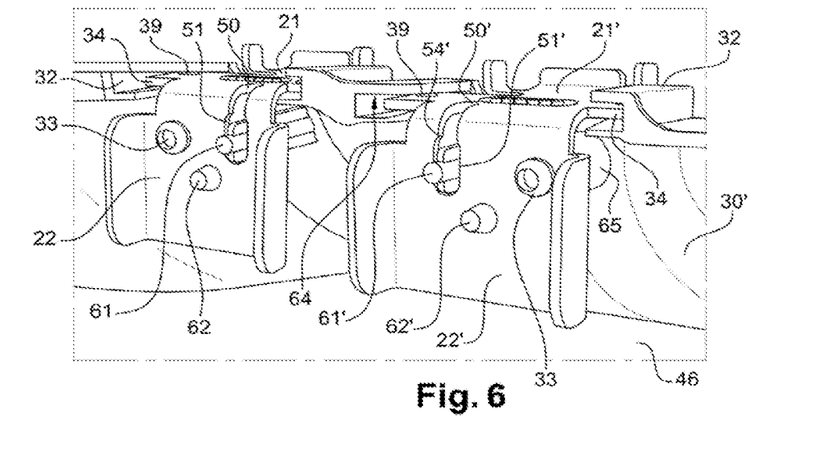
FIG. 6 shows to a larger scale a part of FIG. 5, still in perspective but in a different orientation.

As can be seen in FIGS. 5 and 6, the three reflectors 30, 30', 30" are formed on the plate 46.

This plate 46 comprises means 45 for fixing it to the housing of the light-emitting device 1, some of which are adapted to enable adjustment of the orientation of this plate 46 during use of the light-emitting device in the vehicle.

The reflecting surfaces of the reflectors 30, 30', 30" have different shapes so that the light rays from each reflector form elementary light beams with different photometrics. These elementary light beams together form the general light beam emitted by the light-emitting device 1.

However some reflectors, such as in this example the left-hand reflector 30" and the central reflector 30, can be adapted to receive from the LED light rays of identical power and in identical positions relative to the referencing elements of the support that carries them. The light source supports of these reflectors 30, 30" can therefore be interchanged.

Also, other reflectors, as in this example the right-hand reflector 30' and the central reflector 30, can be adapted to receive from the LED light rays of different powers and/or in different positions relative to the referencing elements of the support that carries them. The light source supports of these reflectors 30, 30' must therefore not be interchanged.

As can be seen in FIGS. 5 and 6, to mount the support relative to the reflector the transverse tongues 34 of the support 20, 20', 20" are inserted in slideways 32.

In this example, each of the reflectors 30, 30', 30" comprises at the rear a projection 61 extending from the inactive face 30*b* of the reflectors 30, 30', 30" along an axis parallel to the longitudinal axis X. This projection 61 penetrates into the interior of the first portion 51 of the oblong hole 50. Because of this, the support 20, 20', 20" is free to slide along the slideways 32 when positioning it at the level of the corresponding reflector 30, 30', 30". Moreover, this first portion 51 of the oblong hole 50 extends along the vertical axis Z. It is therefore possible to adjust the support with respect to the vertical axis Z relative to this projection 61 before the bosses 39 are inserted into the slideways 32.

Each of the slideways 32 comprises an entry 63, these slideways 32 being oriented transversely, i.e. the latter comprise sliding walls 64 against which the tongues 34 and the summits of the bosses 39 of the support 20, 20', 20" can slide.

At the end of each slideway 32, and therefore in this example at the front of each of the latter, is arranged an end 35 in a plane substantially perpendicular to the longitudinal axis X. Accordingly when mounting the support 20, 20', 20" on the plate 46 the tongues 34 are first inserted inside the slideways 32 via the corresponding entry 63 (to clarify the figures only one entry carries a reference).

Here these slideways 32 are oriented along an axis parallel to the longitudinal axis X. The sliding of the support 20, 20', 20" and in particular of these tongues 34 inside the slideways 32 is therefore a movement in longitudinal translation.

This being so, the bosses 39 situated at the front on the tongues 34 are then inserted in these slideways 32 and come into contact with the sliding walls 64.

Then the bosses 39 located at the rear on the tongues 34 in turn enter the interior of the slideways 32. In a concomitant or offset manner, the projection 61 enters into the interior of the first portion 51 of the oblong hole 50. This being so, as sliding continues, the projection 61 continues to traverse the second portion transversely to the plate forming the second part 22.

The front edges 36 then come into contact with the end 35 of each of these slideways 32. Referencing with respect to the longitudinal axis X is therefore provided because of this contact in a vertical plane substantially perpendicular to the longitudinal axis X.

Likewise, the bosses 39 being inside the slideways 32 and the sliding walls 64 being in a plane substantially perpendicular to the vertical axis Z, the contact of the summits of these bosses 39 with these sliding walls provides referencing with respect to the vertical axis Z.

Moreover, the projection 61 is such that at its end of travel its lateral edges come into contact with the lateral edges 53a, 53b of the first portion 61 of the oblong hole 50. Because of this, the areas of this projection 61 in contact with the lateral edges 53a, 53b are aligned along a transverse axis Y. This therefore provides referencing with respect to this transverse axis Y.

Accordingly, at the end of sliding the whole of the supports 20, 20', 20" and therefore the light sources are positioned relative to the corresponding reflectors 30, 30', 30".

According to one embodiment of the invention, for example as shown, the referencing elements enable mounting by sliding in slideways to reference this support. In the example shown, this mounting is facilitated.

This mounting also enables simple positioning of the LED on its support before mounting the latter in the light-emitting device, using as markers the referencing elements of the support, without adding other markers or other referencing elements.

According to the invention, each reflector 30, 30', 30" can comprise a stud 62 extending longitudinally from its inactive surface 30b. The stud 62 is arranged so that when the referencing elements 50, 39, 36 are in contact with the complementary referencing elements 61, 64, 35 the stud 62 is in contact with the first fixing hole 56. It then suffices to screw a screw 33 through this first fixing hole 56 and into the stud 62 to fix the support 20, 20', 20" firmly to the reflector. The shapes of the support with two transverse parts and the slideways reinforce this pressing.

A lug 62, 62' can also extend longitudinally from the inactive face of each reflector 30, 30'. At the end of positioning this lug is clicked into the second fixing hole 57. This lug 62, 62' is adapted to retain an electrical wiring loom supplying power to the LED of the supports 20, 20' and 20" and connecting the latter to a general electrical wiring loom inside the housing 1, this general electrical wiring loom being intended to be connected to the battery of the vehicle.

According to the invention, to prevent the risk of interchanging the supports of some reflectors, here the supports 20, 20" associated with the central reflector 30 or the left-hand reflector 30" with that 20' of the right-hand reflector 30', the positions of the fixing holes 56, 57 and the first portion 51 in the second part can be different in these supports. For example and as shown, between the second part 22 of the support 20 associated with the center reflector 30 and the second part 22' of the support 20' associated with the right-hand reflector 30' these positions are reversed, i.e. symmetrical with respect to a plane, here a longitudinal plane. Because of this the second portion 52 is on the left in the second part 51' of the support 20' associated with the right-hand reflector 30' and on the right in the second part 51 of the support 20 associated with the central reflector 30.

According to the invention and as here, the first portion 51, 51' of the oblong hole 50, 50' can comprise a constriction 54, 54' situated between or at the level of the end of this first portion 51, 51' nearest the second portion 52, i.e. at the top in the position mounted in the light-emitting device 1. This constriction makes it possible to prevent the projection 61, 61' extending from the first portion 51, 51' to the second portion 52.

In this example, the support 20, 20', 20" can comprise an orifice 38 through which passes a connector 16 connected to the printed circuit 15. In FIG. 5 can be seen the connecting tracks 18 passing through the hole 38 in order to be connected to the connector 16, not shown in FIG. 5.

This connector 16 is adapted to receive a connector 40 on a power supply cable 41.

To facilitate sliding, a gap 31 can be provided between the reflector 30 and the zone for the first part 21 to pass through.

The invention claimed is:

1. A support for a light source of a lighting device of a motor vehicle, comprising:
a zone for positioning the light source,
referencing elements with respect to three given mutually transverse axes, one of the referencing elements that is a referencing element with two portions, comprising:
a first portion extending along or parallel to a first given axis of the three given axes, and
a second portion extending transversely relative to the first given axis, wherein a connection portion extends contiguously between the first portion and the second portion, at least one of a plurality of complementary referencing elements coupled to the first portion, and the first portion is wider than the connection portion and the second portion to limit movement of the at least one of a plurality of complementary referencing elements to the first portion.

2. The support according to claim 1, further comprising:
a first surface extending transversely relative to the first given axis and comprising said second portion and said positioning zone, and
a second surface that is oriented on a side of the first surface, is transverse to the first surface, extends along or parallel to the first given axis and comprises said first portion.

3. The support according to claim 2, comprising a wall comprising the second surface, the first portion being a recess formed in the wall and opening onto the second surface.

4. The support according to claim 2, wherein the first surface comprises the other referencing elements.

5. The support according to claim 2, wherein the first surface and the second surface join via a bent or curved surface portion, said referencing element with two portions being a hole straddling the first and second surfaces, a part of the hole on the first surface forming said second portion of said referencing element with two portions and a part of the hole on the second surface forming said first portion of said referencing element with two portions.

6. The support according to claim 2, further comprising:
a first part in the form of a plate and comprising the first surface, and
a second part in the form of a plate comprising the second surface, the two plates being transverse to each other.

7. The support according to claim 6, wherein the first part comprises at least three bosses forming projections on the first surface, a summit of each of the at least three bosses being coplanar in a plane substantially perpendicular to said first given axis.

8. The support according to claim 6, wherein the support is produced by deformation of a sheet of metal comprising a rectilinear oblong hole extending along its length, the deformation being effected around a given direction perpendicular to this length of said oblong hole.

9. The support according to claim 1, wherein the three given axes are orthogonal to one another.

10. The support according to claim 1, wherein the light source is fixed to the positioning zone, the light source being a light-emitting light source.

11. A vehicle light-emitting device comprising:
at least one support according to claim 1,
at least one shaping optic and said plurality of complementary referencing elements adapted to be in contact with the referencing elements of the support, so that the shaping optic receives most of the light rays emitted by the light source and diverts them to form a given photometric beam.

12. The light-emitting device according to claim 11, wherein said plurality of complementary referencing elements comprise a projection extending lengthwise along or parallel to a second of the three given axes, termed said second given axis, said referencing element with two portions of the support being a hole in the support, the projection extending into this hole and having zones of contact with edges of the hole, the zones of contact being on either side of the projection and aligned in a direction parallel to a third of the three given axis, termed the third given axis.

13. The light-emitting device according to claim 12, wherein said plurality of complementary referencing elements comprise aligned slideways along or parallel to said second given axis, and the support further comprises tongues accommodated in the slideways and adapted to slide in the slideways.

14. The light-emitting device according to claim 13, wherein the slideways comprise an end lying in a plane substantially perpendicular to said second given axis, and wherein the support includes the tongues each having an edge extending substantially perpendicularly to said second given axis and in contact with one of the ends.

15. The light-emitting device according to claim 14, in which the support comprises at least three bosses distributed over the tongues and the slideways comprise sliding walls extending between an entry and the end of each of the slideways, the sliding walls being substantially perpendicular to said first given axis and oriented toward an interior of the slideway, each boss having a summit, each of the summits being coplanar in a plane substantially perpendicular to said first given axis, each of the summits of each of the bosses being in contact with the sliding walls.

16. The support according to claim 3, wherein the first surface comprises the other referencing elements.

17. The support according to claim 3, wherein the first surface and the second surface join via a bent or curved surface portion, said referencing element with two portions being a hole straddling the first and second surfaces, a part of the hole on the first surface forming said second portion of said referencing element with two portions and a part of the hole on the second surface forming said first portion of said referencing element with two portions.

18. The support according to claim 3, further comprising:
a first part in the form of a plate and comprising the first surface, and
a second part in the form of a plate comprising the second surface, the two plates being transverse to each other.

19. The support according to claim 7, wherein the support is produced by deformation of a sheet of metal comprising a rectilinear oblong hole extending along its length, the deformation being effected around a given direction perpendicular to this length of said oblong hole.

20. The support according to claim 2, wherein the three given axes are orthogonal to one another.

* * * * *